US010179650B2

(12) United States Patent
Morgan

(10) Patent No.: US 10,179,650 B2
(45) Date of Patent: Jan. 15, 2019

(54) SLIDING SEATING UNIT PANEL FOR PROVIDING ENHANCED PASSENGER INGRESS AND EGRESS

(71) Applicant: B/E Aerospace, Inc., Wellington, FL (US)

(72) Inventor: Edward W. Morgan, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/456,400

(22) Filed: Mar. 10, 2017

(65) Prior Publication Data

US 2017/0259923 A1    Sep. 14, 2017

Related U.S. Application Data

(60) Provisional application No. 62/306,345, filed on Mar. 10, 2016.

(51) Int. Cl.
    B64D 11/06    (2006.01)
    B60N 2/75    (2018.01)

(52) U.S. Cl.
    CPC ...... B64D 11/0644 (2014.12); B64D 11/0606 (2014.12); B60N 2/773 (2018.02)

(58) Field of Classification Search
    None
    See application file for complete search history.

(56) References Cited

U.S. PATENT DOCUMENTS

| 3,025,108 | A | * | 3/1962 | Teague, Jr. | A61G 15/02 297/327 |
| 3,140,119 | A | * | 7/1964 | Offner | A61G 5/12 297/115 |
| 3,409,326 | A | * | 11/1968 | Kerner | B60N 2/4221 280/753 |
| 3,583,760 | A | * | 6/1971 | McGregor | A47B 5/006 297/145 |
| 5,383,704 | A | * | 1/1995 | Granados | B60N 2/753 297/115 |
| 9,216,674 | B1 | * | 12/2015 | Garib | B60N 2/91 |
| 9,630,720 | B2 | * | 4/2017 | Saint-Jalmes | B64D 11/0644 |
| 2002/0089217 | A1 | * | 7/2002 | Scheerhorn | B60R 7/04 297/188.19 |

(Continued)

Primary Examiner — Kyle J. Walraed-Sullivan
(74) Attorney, Agent, or Firm — Clements Bernard Walker PLLC

(57) ABSTRACT

In an illustrative embodiment, a seating apparatus for positioning at an aisle of an aircraft cabin includes a passenger seat and an armrest assembly mounted adjacent to the passenger seat. The armrest assembly includes a fixed panel adjacent to a seat back that extends along a portion of a seat bottom and a sliding portion that extends from a retracted position where a majority of the sliding panel is parallel to the fixed plane to an extended position where a rear end of the sliding panel is adjacent to a forward end of the fixed panel. A translation assembly slidably connects the sliding panel to the fixed panel to enable the sliding panel to move between the retracted and extended positions. In the extended position, an armrest portion of the fixed panel is flush with an armrest portion of the sliding portion to create an extended panel unit.

10 Claims, 18 Drawing Sheets

(56) References Cited

U.S. PATENT DOCUMENTS

| | | | | |
|---|---|---|---|---|
| 2002/0175550 | A1* | 11/2002 | Park | A47C 7/543 297/411.32 |
| 2006/0108816 | A1* | 5/2006 | Radu | B60R 7/04 296/24.34 |
| 2009/0152915 | A1* | 6/2009 | Krasna | A47C 1/0342 297/217.3 |
| 2010/0066113 | A1* | 3/2010 | Browne | B60N 3/102 296/24.34 |
| 2010/0207414 | A1* | 8/2010 | Tsuda | B60R 7/04 296/37.8 |
| 2011/0049960 | A1* | 3/2011 | Ferguson | B64C 11/065 297/411.38 |
| 2012/0086184 | A1* | 4/2012 | Derks | A61G 5/12 280/304.1 |
| 2013/0002001 | A1* | 1/2013 | Allen | B60N 3/101 297/411.3 |
| 2013/0153447 | A1* | 6/2013 | Cinco | B60N 2/4686 206/216 |
| 2013/0181500 | A1* | 7/2013 | Buehlmeyer | B60N 2/38 297/463.1 |
| 2013/0241258 | A1* | 9/2013 | Wallace | A47C 17/12 297/354.13 |
| 2014/0183923 | A1* | 7/2014 | Itzinger | B64D 11/06 297/411.38 |
| 2014/0217798 | A1* | 8/2014 | Negusse | A47C 7/543 297/411.3 |
| 2014/0300147 | A1* | 10/2014 | Suhre | B60N 2/4606 297/170 |
| 2015/0165944 | A1* | 6/2015 | Almeida | B60N 2/4626 297/411.31 |
| 2015/0321592 | A1* | 11/2015 | De Morais | B64D 11/06 297/147 |
| 2016/0001684 | A1* | 1/2016 | An | B60N 2/4686 296/37.5 |
| 2016/0101867 | A1* | 4/2016 | McLaughlin | B64D 11/0689 297/411.35 |
| 2016/0107550 | A1* | 4/2016 | Hwang | B60N 2/4686 297/161 |
| 2016/0272323 | A1* | 9/2016 | Carlioz | B64D 11/0646 |
| 2016/0279003 | A1* | 9/2016 | Newfer | A61G 5/125 |
| 2016/0297335 | A1* | 10/2016 | Lee | B60N 2/773 |
| 2017/0015224 | A1* | 1/2017 | Colsky | B60N 2/4673 |
| 2017/0029118 | A1* | 2/2017 | Ehrmann | B64D 11/0601 |
| 2017/0057387 | A1* | 3/2017 | Jang | B60N 2/4686 |
| 2017/0101188 | A1* | 4/2017 | Auge | B64D 11/0644 |
| 2017/0215592 | A1* | 8/2017 | Cummins | A47C 7/543 |
| 2017/0259714 | A1* | 9/2017 | Mao | B60N 2/4646 |
| 2017/0369173 | A1* | 12/2017 | Lee | B64D 11/0638 |

* cited by examiner

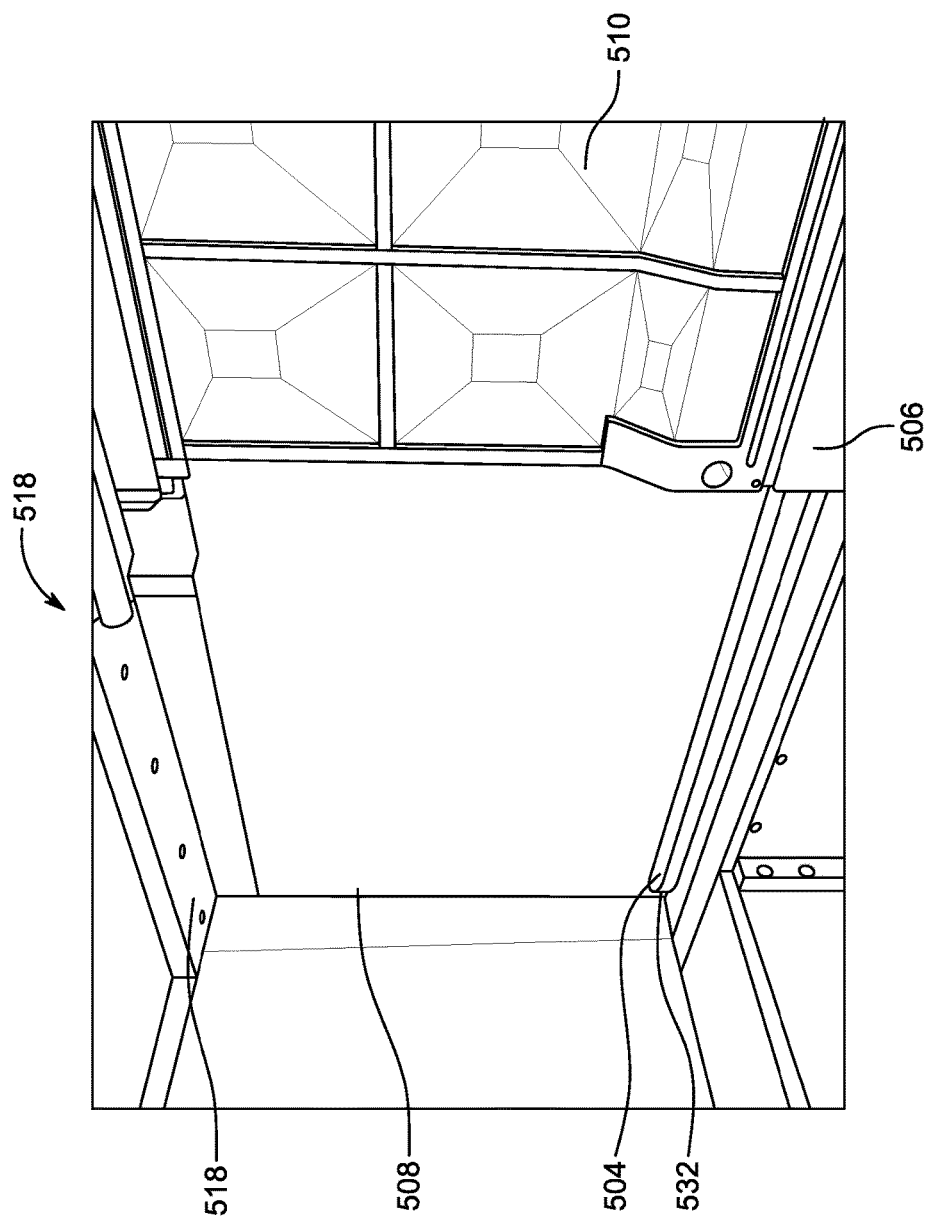

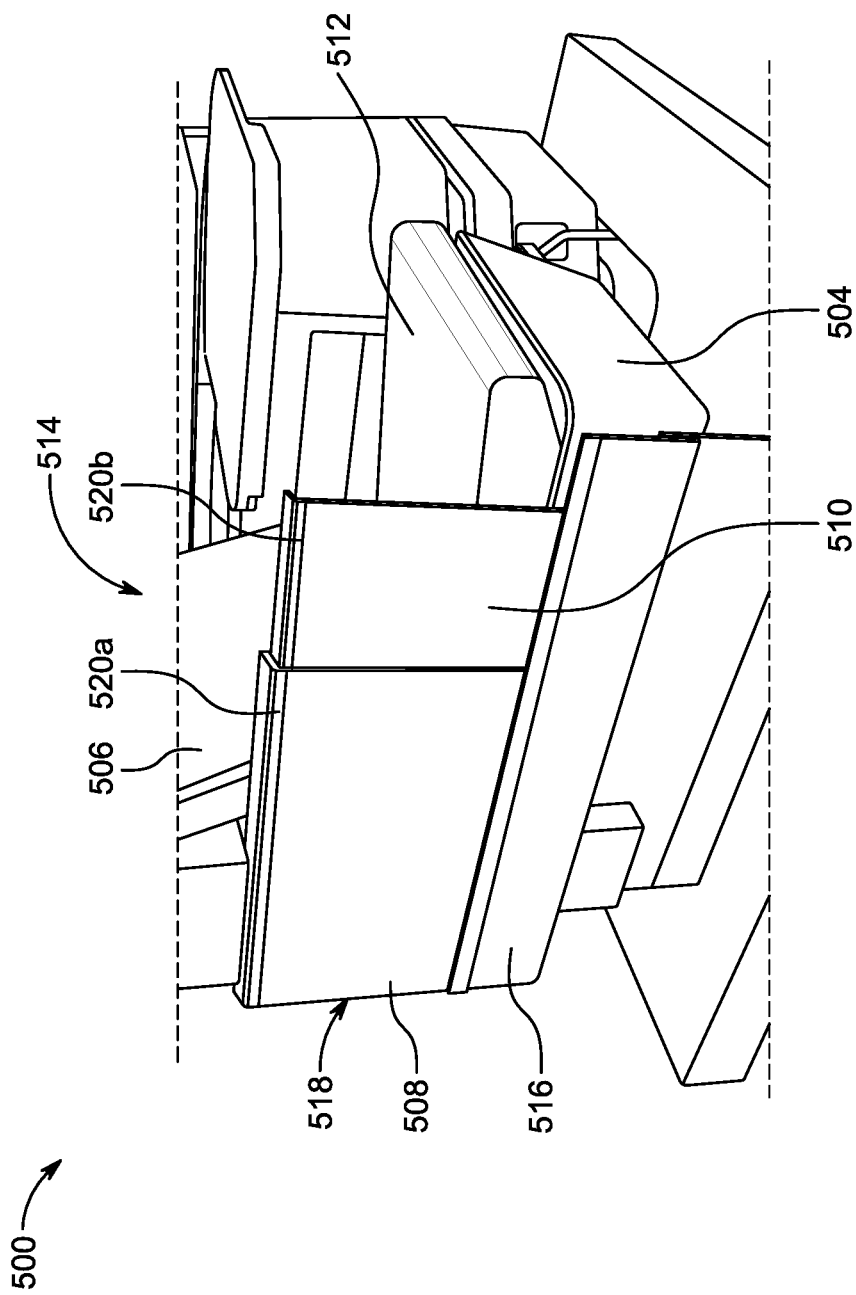

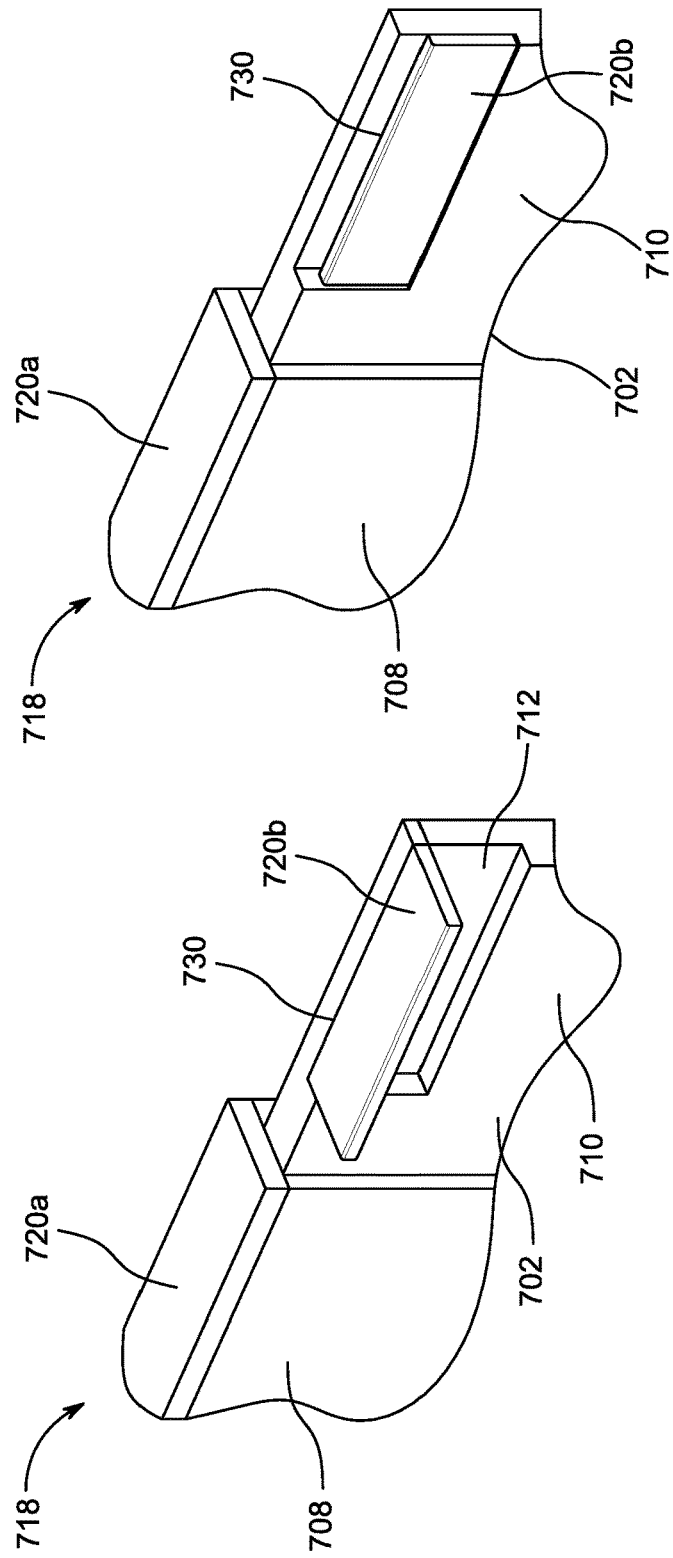

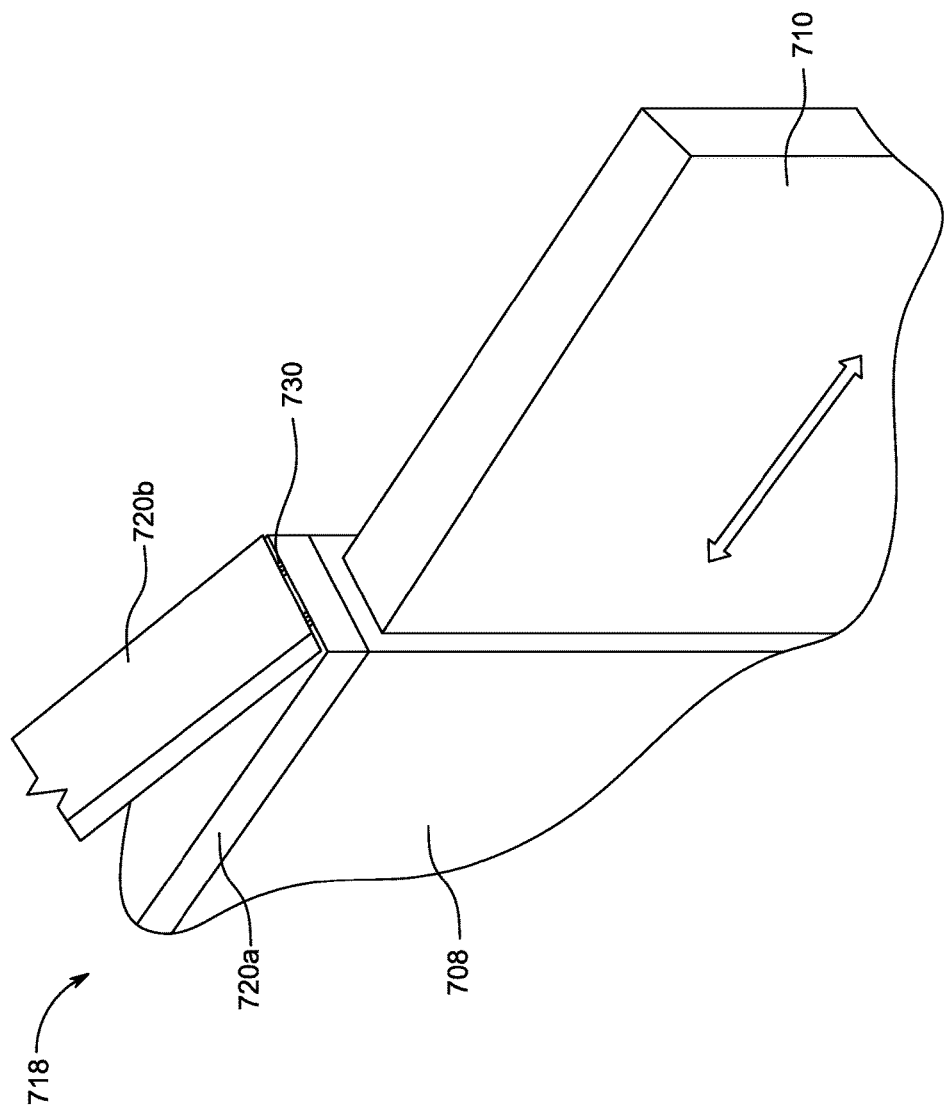

SLIDING SEATING UNIT PANEL FOR PROVIDING ENHANCED PASSENGER INGRESS AND EGRESS

RELATED APPLICATIONS

This application claims priority to U.S. Provisional Patent Application Ser. No. 62/306,345, entitled "Sliding Seating Unit Panel for Providing Enhanced Passenger Ingress and Egress," filed Mar. 10, 2016, the contents of which are hereby incorporated by reference in their entirety.

BACKGROUND

Business class aircraft cabins are typically made up of multiple seating modules that provide passengers a comfortable traveling experience with various amenities that are much improved over the amenities found in an economy class cabin. For example, each seat can be enclosed in a module that provides privacy to the passenger and a seating configuration that allows seats to move from an upright to a fully reclined bed configuration. The module can also include increased table and entertainment space. However, due to the increased space and amenities of the modular business class seats along with aisle width and other airline cabin space regulations, an amount of space between seating modules may be limited. For example, when the seat is the fully reclined bed configuration, the footrest of the seat may directly contact a forward seating module, making passenger ingress and egress from the seat difficult. In addition, persons with reduced mobility (PRM) may have also have difficulty ingressing and egressing from the seating modules due to the configuration of the seating modules. For example, PRM may have difficulty moving across inboard seating modules that are adjacent to aircraft aisles in order to reach an outboard seating module. In addition, the PRM may also have difficulty navigating around extended armrests or panels when entering or leaving the seating module.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, an aircraft seating module for positioning at an aisle of an aircraft includes a sliding panel assembly to provide enhanced passenger ingress and egress from a passenger seat. The sliding panel assembly includes a fixed panel adjacent to a seat back that extends along a portion of a seat bottom and a sliding portion that extends from a retracted position where a majority of the sliding panel is parallel to the fixed panel to an extended position where a rear end of the sliding panel is adjacent to a forward end of the fixed panel. A translation assembly slidably connects the sliding panel to the fixed panel to enable the sliding panel to move between the retracted and extended positions. In the extended position, an armrest portion of the fixed panel is flush with an armrest portion of the sliding portion to create an extended panel unit. The translation assembly may be partially mounted to a base panel disposed beneath the sliding panel.

In certain embodiments, the translation assembly includes a slide and a rail configured for gliding movement of the sliding panel respective to the fixed panel. At a fully extended position, in some implementations, the translation assembly includes a vertical translation mechanism for raising the sliding panel into alignment with the fixed panel. The vertical translation mechanism, for example, may include a pivoting linkage assembly.

In some implementations, an armrest portion covers a top of each of the fixed panel and the sliding panel to create an extended armrest. The armrest portion of the sliding panel, upon retraction, may nest beneath an armrest portion of the fixed panel. In other examples, the armrest portion of the sliding panel may be rotatably connected to the sliding panel to aid in retraction and stowage of the sliding panel, or the armrest portion of the sliding panel may be hingedly connected to the armrest portion of the fixed panel such that the armrest portion rests atop the sliding panel upon extension, and stows separately from the sliding panel upon retraction.

In some implementations, the sliding panel assembly includes a locking mechanism for locking a position of the sliding panel in at least one of the stowed and extended positions. In one example, the locking mechanism includes at least one detent, such as a spring detent, for maintaining a position of the sliding panel. In another example, the locking mechanism includes mating features, such as a raised portion on one of the sliding panel and the base panel, and a corresponding indent portion on one of the sliding panel and the base panel, providing a friction lock mechanism to releasably secure the sliding panel in at least one of the stowed and the deployed positions. In a further example, the locking mechanism includes at least one latch for maintaining position of the sliding panel. The latch may be manually actuated, for example through pressing a button. The latch may be electrically actuated, such as a sensor-activated latch that actuates upon the sliding panel reaching one of its stowed and deployed positions.

In some implementations, the sliding panel assembly includes an automated control assembly configured to automatically translate the sliding panel between the retracted position and the extended position. The automated control assembly may include a linear translation mechanism (e.g., linear actuator) to automatically move the sliding panel from the stowed position to the extended position. The automated control assembly may further include a vertical translation mechanism to automatically move the sliding panel, upon extension, from a lowered position to a raised position in line with the fixed panel. In on example, the automated control assembly includes a ball screw configured to provide both horizontal and vertical translation. In another example, the linear translation mechanism may include a belt drive. In a further example, the linear translation mechanism may include a pneumatic drive.

Benefits of the translation assembly include improved accessibility to the seating module. For example, through retracting the sliding panel, the passenger may more easily enter and exit the seating module. Ease of entry and exit may be particularly useful for persons of reduced mobility (PRM) who may otherwise struggle to enter and exit the tight quarters of airline seating. In embodiments including a passenger seat capable of lie-flat (bed) positioning, retraction of the sliding panel may allow the passenger to exit the seating module without returning the passenger seat to an upright position.

Benefits of the translation assembly further include increased privacy. In certain embodiments, the translation assembly is installed in a walled, semi-private seating unit, for example, in business class seating. The sliding panel may increase security and reduce interruption to a sleeping passenger in lie-flat position through masking the view of the aisle to the sleeping passenger and obstructing any articles from entering the seating module near the extended sliding panel.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 5A is an exemplary illustration of a sliding armrest assembly in a lowered position;

FIG. 5C is an exemplary illustration of an aircraft seating module with a sliding armrest assembly in a partially retracted position;

FIGS. 7A-7B are exemplary illustrations of a sliding armrest assembly with a pocket door configuration and a rotating armrest; and FIGS. 7C-7E are exemplary illustrations of a sliding armrest assembly with a folding armrest.

DETAILED DESCRIPTION OF ILLUSTRATIVE EMBODIMENTS

Figure 1:
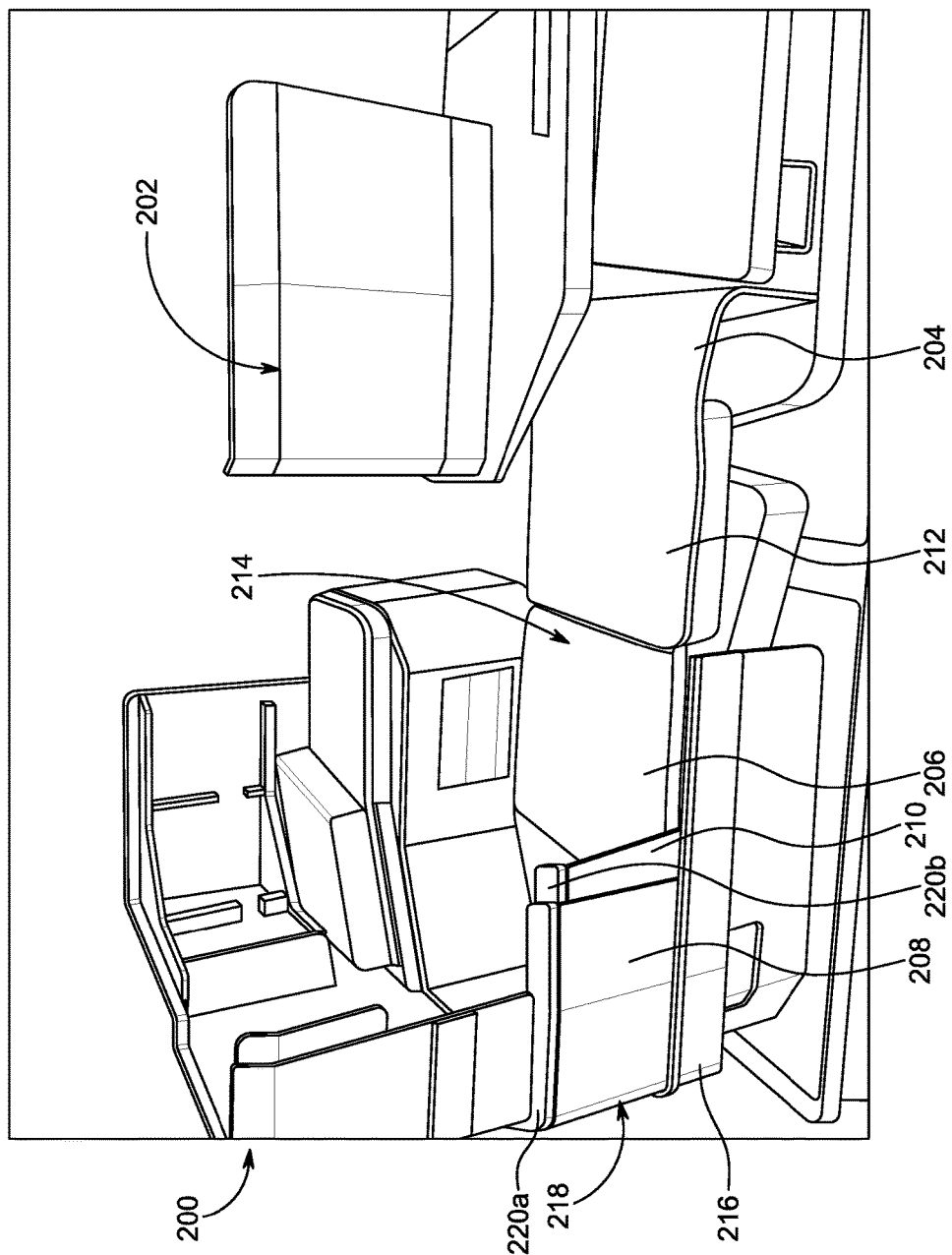
FIG. 1 is an exemplary illustration of a portion of an aircraft cabin with a seating module in a fully reclined position.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Figure 2:
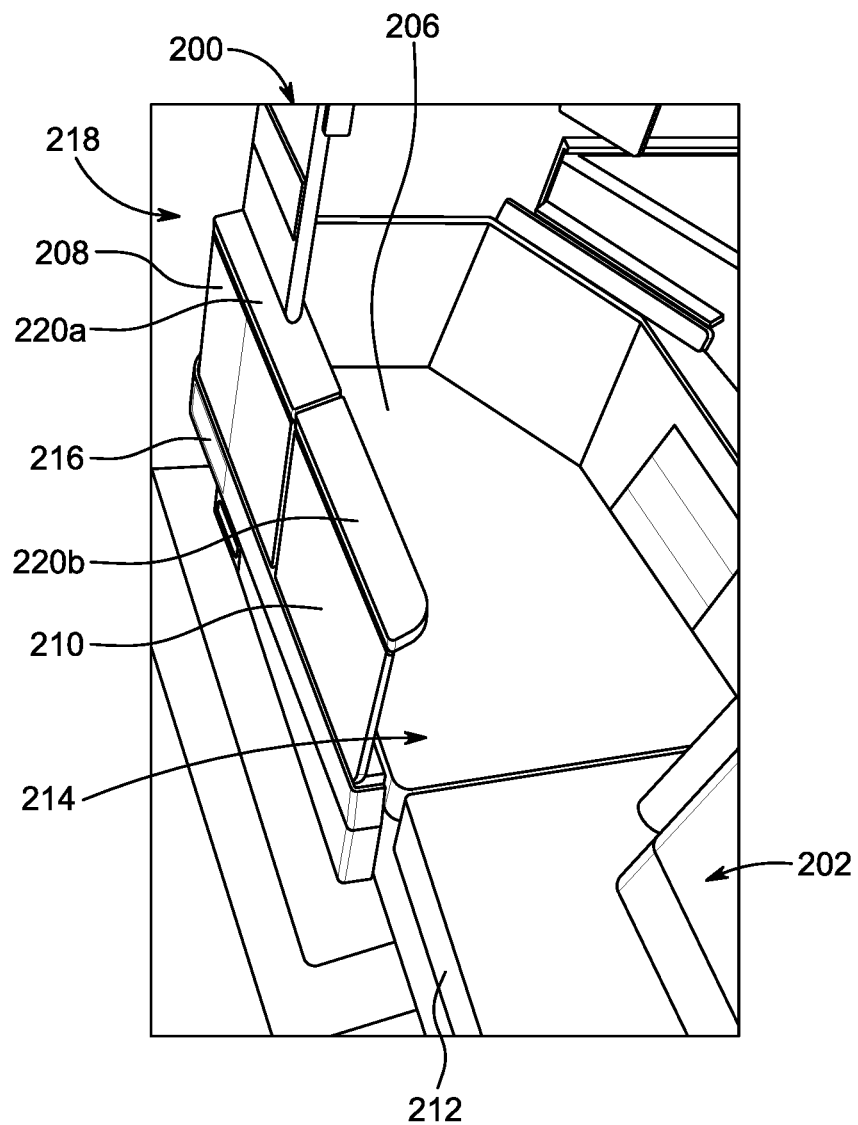
FIG. 2 is an exemplary illustration of a portion of an aircraft cabin with a passenger lying down in a seating module and a sliding armrest assembly in an extended position.

FIG. 1 illustrates a portion of an aircraft cabin that includes seating modules 200 and 202 in which seating module 200 is positioned directly behind seating module 202. In some implementations, the seating modules 200 and 202 include sliding armrest assemblies 218 and are positioned adjacent to aisles of an aircraft cabin to improve an ability of a passenger to ingress or egress from the seating modules 200 or 202. A passenger seat 214 of the seating module 200 is in a fully reclined lie-flat configuration (e.g., bed configuration) such that a back portion 206 of the passenger seat passenger seat 214 lies substantially parallel to and in line with a seat bottom 212 of the passenger seat passenger seat 214 creating a substantially flat surface on which a passenger can lie down. The seating module 200 may include components such as privacy panels, storage consoles, shelving, desk/table surfaces, or entertainment consoles that surround one or both sides of the passenger seat passenger seat 214 to provide privacy and comfort to the passenger. When the passenger seat passenger seat 214 of the seating module 200 is in the fully reclined position, a footrest 204 of the passenger seat passenger seat 214 extends to reach of a rear panel of the forward seating module 202, which reduces or eliminates a clearance area between the seating modules 200 and 202, which can impede an ability of a passenger to ingress or egress from the seating module 200 when the passenger seat passenger seat 214 is in a partially or fully reclined position. For example, FIG. 2 is an illustration of a passenger 222 lying down in the seating module 200 when the passenger seat passenger seat 214 is in the fully reclined position and the sliding armrest assembly 218 is in a fully extended position. Because at least a portion of the seat bottom 212 and footrest 204 are underneath an adjacent portion of the seating module 202, the passenger 222 does not have a wide enough space to move in and out of the seating module 200. In addition, persons with reduced mobility (PRM) and other passengers may also have difficulty ingressing or egressing from the seating module 200, even while the passenger seat 214 is in its upright taxi takeoff and landing (TTOL) position, due to relative tightness of quarters.

In some implementations, the seating module 200 can have a sliding armrest assembly 218 that is mounted to a base 216 of the seating module 200 and includes a fixed panel 208 and a sliding panel 210 (illustrated in FIG. 2 in a partially retracted position) that slides between an extended position and a retracted position to allow the passenger to more easily ingress or egress from the seating module 200. The fixed panel 208 and sliding panel 210 also include armrest portions 220 on an upper surface of the fixed panel 208 and sliding panel 210, respectively, that provide a surface for a passenger to rest an arm when seated or reclined in the passenger seat 214. The armrest portions 220 can be cushioned to provide improved passenger comfort. As illustrated, the armrest portions 220 may extend horizontally across a greater width than the panel portions of the fixed panel 208 and the sliding panel 210. The armrest portions 220 may be horizontally positioned. In another example, the armrest portions 20 may be slightly canted, for example to increase ergonomics or to discourage setting personal items such as snacks and electronic devices along the armrest portions 220.

In some implementations, an outer surface of the sliding panel 210 translates along an inner surface of the fixed panel 208 as the sliding panel 210 moves between the extended position and the retracted position. In addition, the sliding panel 210 may lower during retraction such that an upper surface of the armrest 220b of the sliding panel 210 can translate along a lower surface of the armrest 220a of the fixed panel 208 as the sliding panel moves between the extended position and retracted position. In another example, the armrest portion of the sliding panel 210 may rotate, raise, or otherwise disconnect from the sliding panel 210 during retraction such that the sliding panel 210 retracts against the fixed panel 208 in a linear movement.

The sliding panel 210, in some embodiments, retracts within a pocket region of the fixed panel 208. As described above, the armrest portion of the sliding panel 210 may rotate, raise, or otherwise disconnect from the sliding panel 210 during retraction such that the sliding panel 210 retracts within the pocket region of the fixed panel 208 in a linear movement. In other examples, the sliding panel 210 may lower during retraction to nest within the pocket region of the fixed panel 208.

Figure 3A:
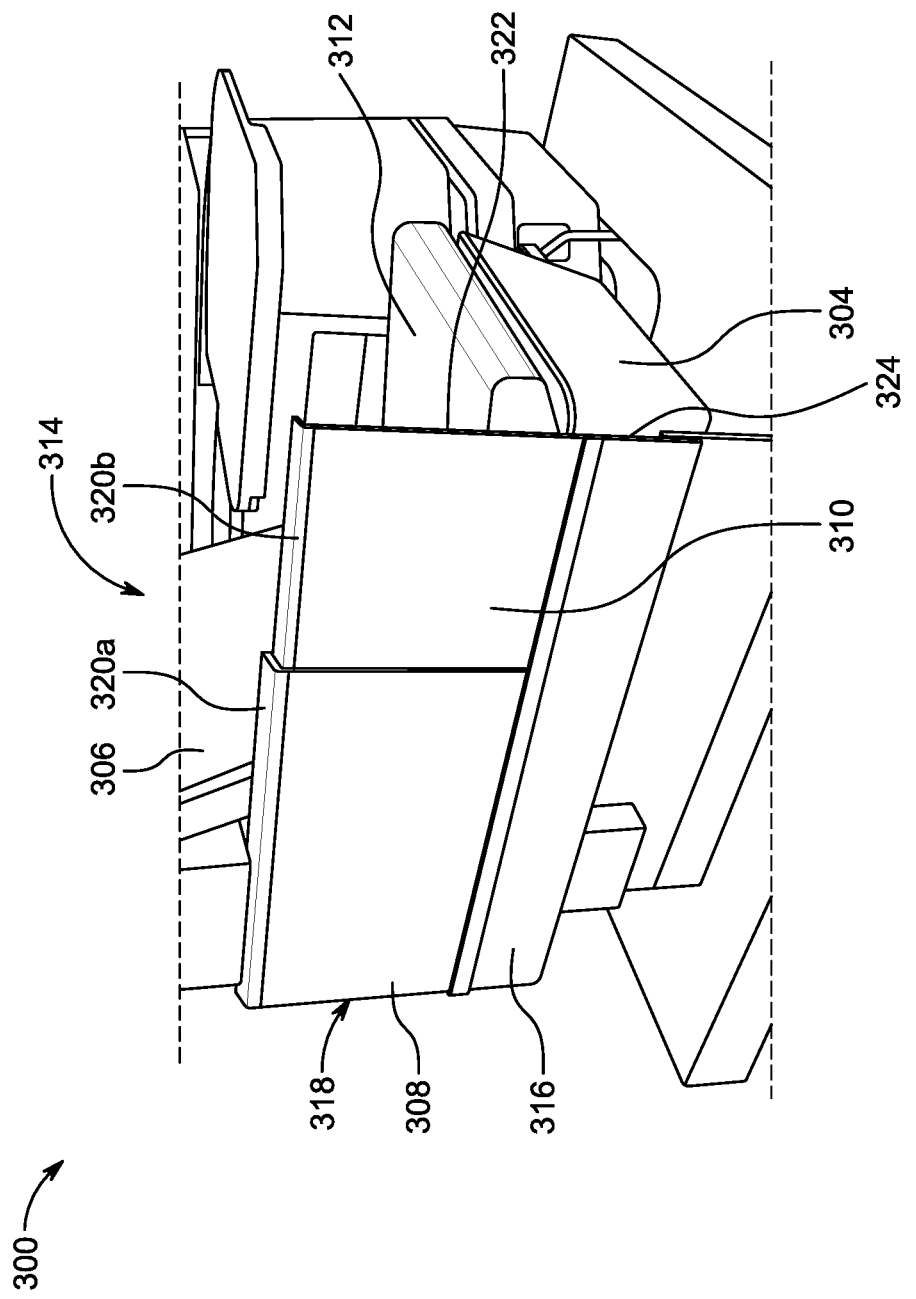
FIG. 3A is an exemplary illustration of a perspective view of an aircraft seating module with a sliding armrest assembly in an extended position.

Turning to FIG. 3A, an outer perspective view of a seating module 300 having a sliding armrest assembly 318 with a sliding panel 310 in an extended position is illustrated. The seating module 300 includes a reclining passenger seat 314 in an upright TTOL position with a back portion 306 that is substantially perpendicular to a back end of a seat bottom portion 312 and a foot rest 304 that is substantially perpendicular to a front end of the seat bottom portion 312 such that the foot rest 304 is tucked under the seat bottom portion 312 of the passenger seat 314. In some implementations, the passenger seat 314 can move between the upright TTOL position and the fully reclined lie-flat position (FIG. 2) in response to activation of a passenger seat reclining mechanism as is conventional in modern business class seating for long distance travel. In one example, a reclining mechanism of the seating module 300 is activated by a pushbutton that allows the passenger to adjust the passenger seat 314 between the upright TTOL, partially reclined, and fully reclined lie-flat positions.

The sliding armrest assembly 318 is mounted to a base panel 316 of the seating module 300 and includes a fixed panel 308 and a sliding panel 310 in an extended and inline position. In one example, the sliding panel 310 is in the extended position when a front edge 322 of the sliding panel 310 is substantially flush with a front edge 324 of base panel 316. Also, when the sliding panel 310 is in the extended position, a first (sliding panel-mounted) portion of a linear extension mechanism may be positioned at a front extension position relative to a second (fixed panel-mounted) mating portion of the linear extension mechanism. In an illustrative example, turning to FIG. 4A, a slide 406 connected to a sliding panel 410 may travel along a track 404 connected to a fixed panel 408 until the sliding panel 410 reaches a front extension stop 430 on the track 404.

Returning to FIG. 3A, the fixed panel 308 and sliding panel 310 also include armrest portions 320 on an upper surface of the fixed panel 308 and sliding panel 310 that provide a surface for a passenger to rest an arm when seated or reclined in the chair 314. The armrest portions 320 can be cushioned to provide improved passenger comfort. In the extended and inline position, an outer surface of the sliding panel 310 is flush with an outer surface of the fixed panel 308 such that the sliding armrest assembly 318 resembles a single panel armrest assembly. In addition, upper, inner, and outer surfaces of the armrest portion 320b of the sliding panel 310 are also flush with upper, inner, and outer surfaces of the fixed panel 308 such that the armrest portions 320a and 320b resemble a single armrest structure when the sliding panel 310 is in the extended and inline position.

Figure 3B:
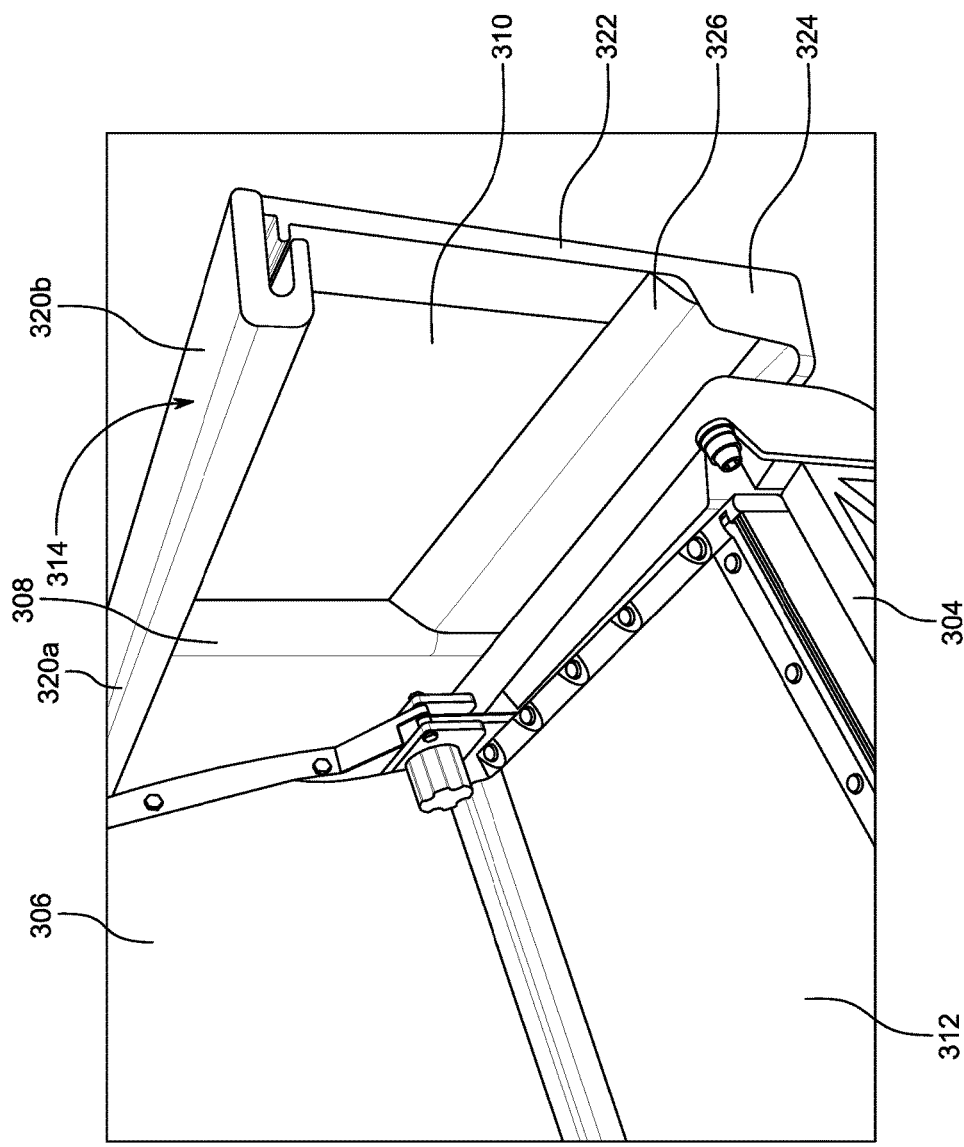
FIG. 3B is an exemplary illustration of an inner perspective view of a sliding armrest assembly in an extended position.
Figure 4A:
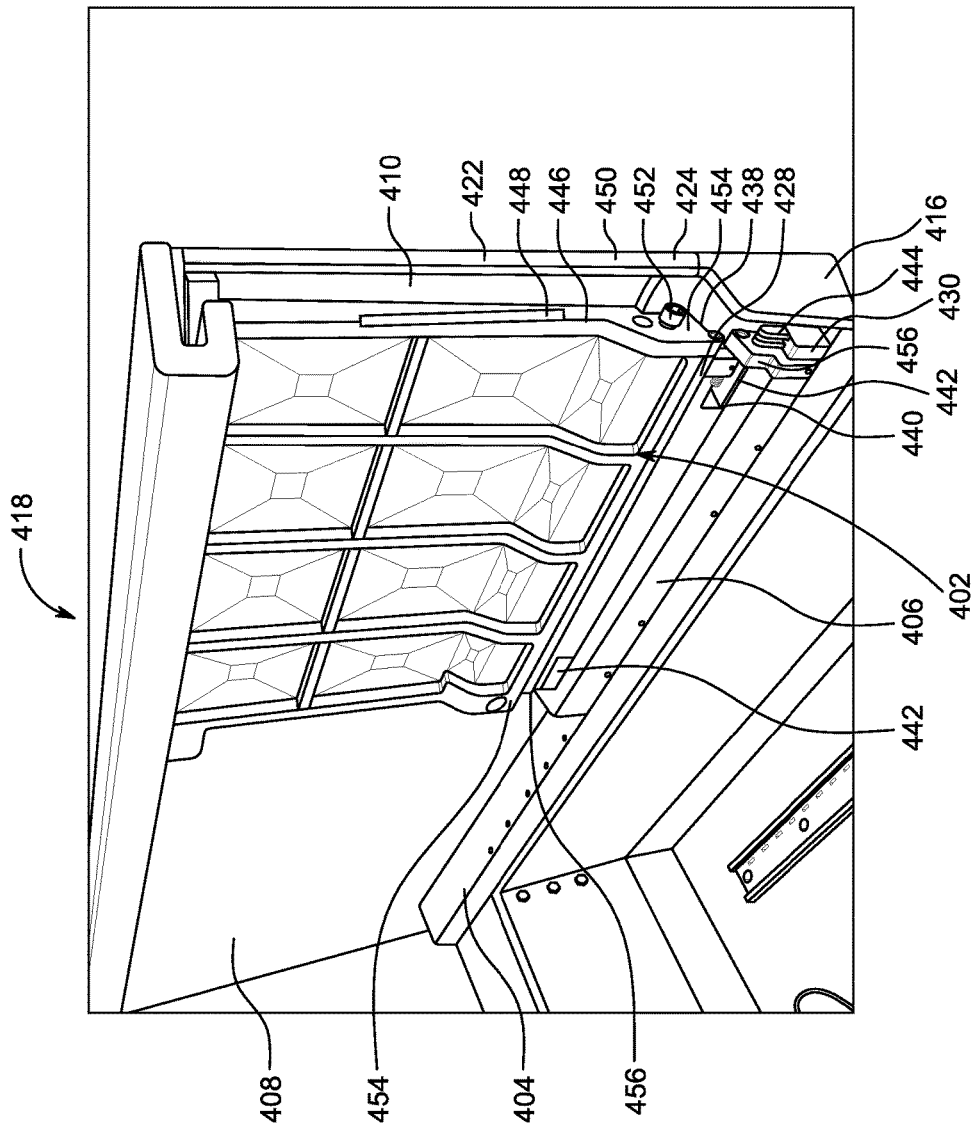
FIGS. 4A-4B are exemplary illustrations of a pivoting assembly of a sliding armrest assembly in a raised position.

FIG. 3B illustrates an inner perspective view of the sliding armrest assembly 318 of the seating module 302 in the extended position. The sliding panel 310 includes an inner cover with a contoured portion 326. The contoured portion 326 may surround a pivoting assembly 402 (see FIGS. 4A-4D) that allows the sliding panel 310 to pivot between a lowered position and a raised position when in the extended position. Turning to FIG. 4A, the pivoting assembly 402 includes a pivoting member 428 connected a lower end of a sliding panel 410 as well as to the track 404 that guides the sliding panel 410 between the extended and retracted positions. In the raised position, such as that shown in FIGS. 3A-3B, the pivoting member 428 of the pivoting assembly 402 is in a substantially vertical position (see FIG. 4A), which secures the sliding panel 310 in the raised position.

As shown in FIG. 3B, in some implementations, an inner surface of the fixed panel 308 and the sliding panel 310 may include a texture treatment to increase comfort of the passenger. As illustrated, for example, a soft fabric layer may be applied to the inner surfaces of the fixed panel 308 and the sliding panel 310 for protecting the passenger during repose. In other embodiments, the texture treatment may include a padding layer to guard against a bumped head or elbow (e.g., in lounge or lie-flat passenger seat position).

Figure 4B:
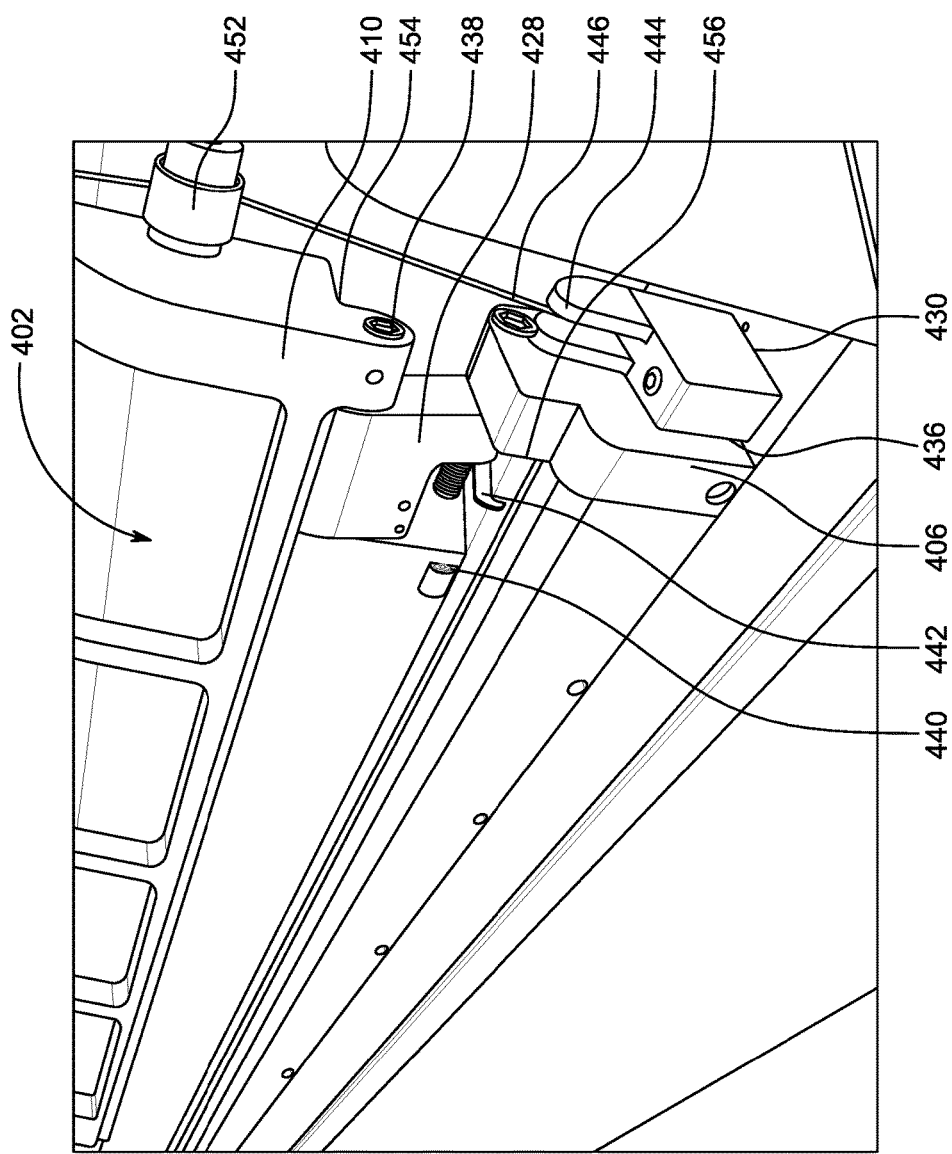

FIGS. 4A-4D illustrate the pivoting assembly 402 for a sliding panel assembly 418 of an aircraft seating module in the extended position in various states of rotation from the raised position to the lowered position. For example, FIG. 4A is an inner perspective view of the sliding panel assembly 418 having a sliding panel 410 in the extended and raised position with the inner cover removed to show pivoting assembly 402, track 404, slider 406, and other components associated with pivoting the sliding panel 410 between the raised and lowered positions as well as extending and retracting the sliding panel 410 along the track 404. FIG. 4B is a zoomed in illustration of the pivoting assembly 402 in the extended position shown in FIG. 4A.

In the extended position, a front edge 422 of the sliding panel 410 is flush with a front edge 424 of base panel 416. Also, when the sliding panel 410 is in the extended position, the slider 406 that travels along the track 404 for the sliding panel 410 rests against a front extension stop 430 on the track 404. In some implementations, the track 404 includes the front extension stop 430 and a back extension stop 532 (see FIG. 5A), which extend below a lower surface of the track 404 at front and rear ends of the track 404 to stop horizontal movement of the sliding panel 410 when a forward or rear edge of the slider 406 contacts the front extension stop 430 or back extension stop 532.

In some implementations, the track 404 is a rail that has a shape that is complementary with a sliding surface 436 of the slider 406 that slides along the track 404 as the sliding panel 410 moves horizontally. In one example, the track 404 has squared edges, and the sliding surface 436 has an L-shape that contacts two adjacent surfaces of the track 404. In other examples, the track 404 and complementary sliding surface 436 of the slider 406 may have other shape and curvature patterns, such as rounded or grooved.

The pivoting assembly 402 includes a pivoting member 428 that connects the sliding panel 410 to the slider 406 and pivots the sliding panel 410 between the raised and lowered positions. In the raised position shown in FIGS. 4A-4B, the pivoting member 428 of the pivoting assembly 402 is in a substantially vertical position, which secures the sliding panel 410 in the raised position. The pivoting member 428 connects to a lower end of the sliding panel 410 at a forward end and rear end by connectors 438 (e.g., rods, pins, or other annular member) that provide for rotation of the pivoting member 428.

The pivoting member 428, in some embodiments, is assisted in translation between lowered position and raised position using an assist spring 442 that bias during rotation of the pivoting member 428 between the raised and lowered positions. A retention mechanism 444 includes a groove that holds one end of a cable 446 that is secured at the other end to a top portion of the sliding panel 410. The cable 446 is wrapped around a guide knob 452 and is held in tension by a spring 448.

The spring 448 biases button or lever 499 in the downward direction. When the passenger lifts button or lever 499, the pivoting member is unlocked and is drawn downward and inward by the user. The spring 442 can bias the panel 410 upwardly or downwardly. In a preferred embodiment, the spring 442 biases the panel upwardly so that a passenger must push the panel downward to overcome the biasing effect of spring 442. The panel 410 lowers through the position shown in FIG. 4C to the position shown in FIG. 4D. At that time the passenger may slide the panel 410 rearwardly into a stowed position (shown in FIG. 6A). When the passenger returns the panel 410 to the forward position, the panel 410 may automatically raise into the forward position flush with the panel 408 by operation of the spring 442 and lock into place.

In an alternative embodiment in which the spring 442 biases the panel 410 downwardly, a dampening element may be used to slow the downward travel of the panel. In such an embodiment the passenger lifts the panel 410 upwardly into the forward position flush with panel 408.

In still a further embodiment, the panel 410 does not move inwardly toward the seat but instead outwardly toward the aisle. This configuration has the advantage that it provides additional space for the passenger. In such configurations, linkages riding on hidden rails may be used to hold the panel in a retracted position while still permitting the panels 408 and 410 to be flush with one another when the panel 410 is in the forward position.

In some implementations, the sliding panel 410 includes a notched edge 450 that contacts an upper edge of the base panel 416 when the sliding panel 410 is in the raised position. The notched edge 450 can have a complementary shape to the upper edge of the base panel 416, which secures the sliding panel 410 in the raised position so that an outer surface of the sliding panel 410 is flush with an outer surface of the fixed panel 408. The sliding panel 410 may also include notches 454 at forward and rear edges of a lower end that engage with complementary panel ledges 456 at forward and rear ends of the slider 406 when the sliding panel 410 is in the lowered position.

Figure 4C:
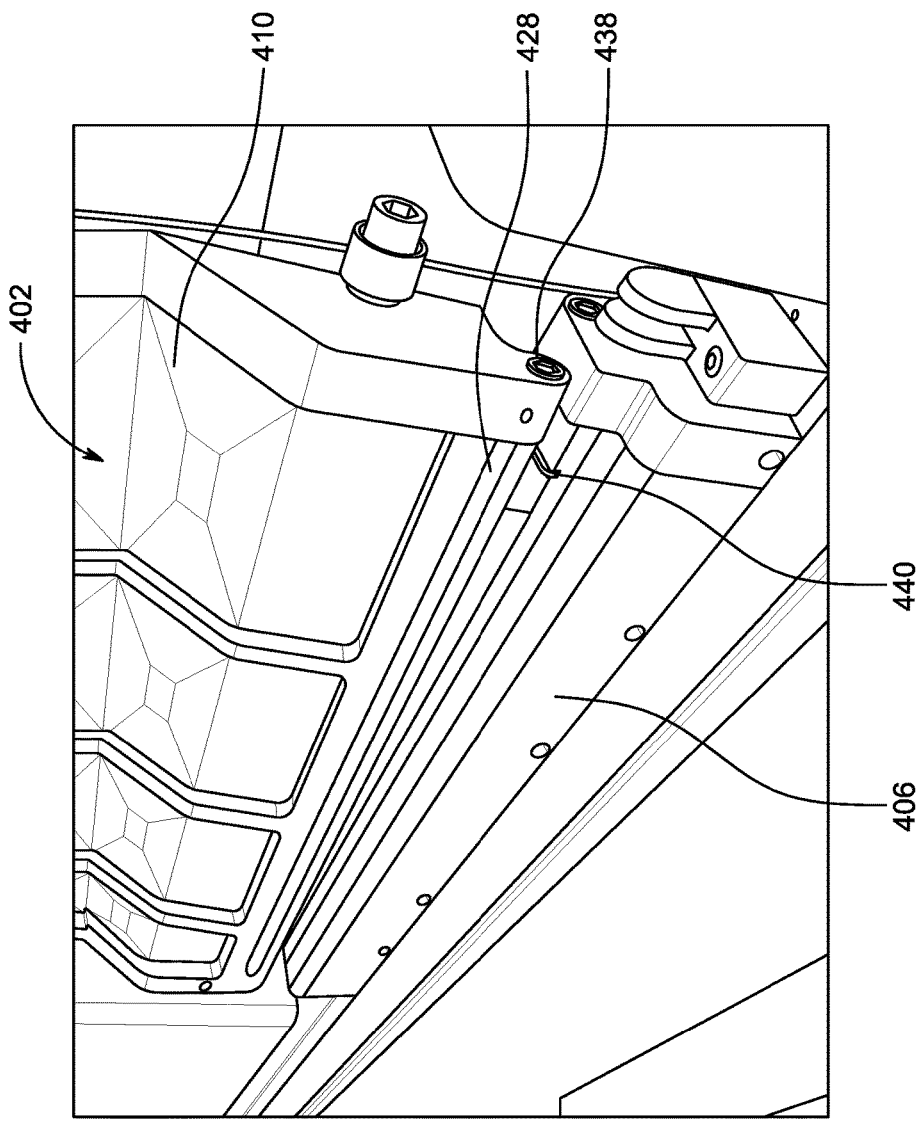
FIG. 4C is an exemplary illustration of a pivoting assembly of a sliding armrest panel in an intermediate position.

FIG. 4C illustrates the pivoting assembly 402 with the pivoting member 428 in an intermediate position between the in-line position and the lowered position while at the extended position. In some implementations, the movement of the sliding panel 410 from the raised, in-line position to the lowered position is manually activated by a passenger pulling the sliding panel 410 inward toward the passenger seat and/or upward. As the sliding panel 410 moves inward of the fixed panel 408, the notched edge 450 (illustrated in FIG. 4B) of the sliding panel 410 disengages from the upper edge of the base panel 416, and the pivoting member 428 begins to rotate inward and downward toward the passenger seat. The pivoting member 428 can rotate at a first pivot point and a second pivot point when rotating from the in-line position to the lowered position. For example, the first pivot point may be the connection between the sliding panel 410 and the pivoting member 428 at the connectors 438. The second pivot point may be the connection between the pivoting member 428 and the rail 440 of the slider 406. At the intermediate position shown in FIG. 4C, the pivoting member 428 is at an intermediate angle between zero and ninety degrees from an upper surface of the slider 406.

Figure 4D:
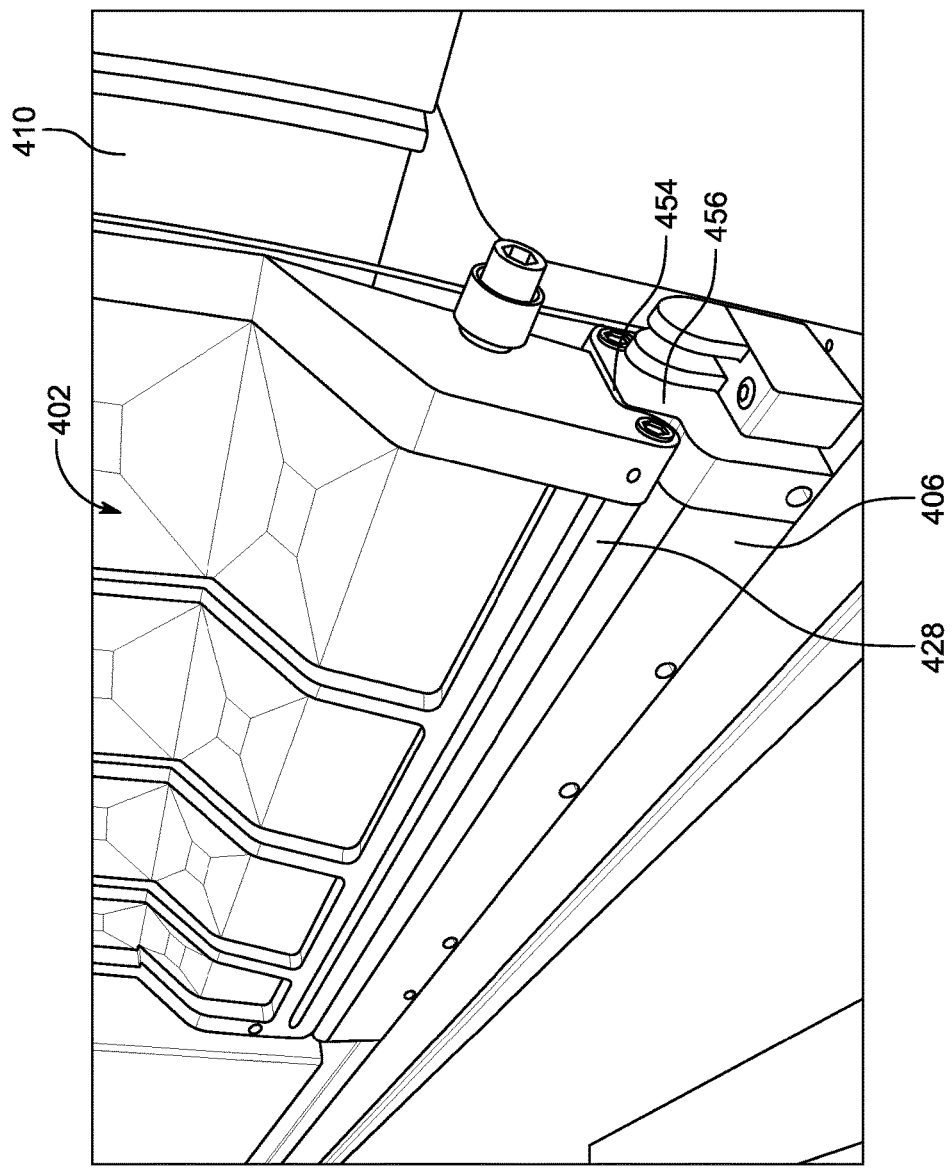
FIG. 4D is an exemplary illustration of a pivoting assembly of a sliding armrest panel in a lowered position.

FIG. 4D is an exemplary illustration of the pivoting member 428 of the pivoting assembly 402 of the sliding panel 410 in a lowered position while at the sliding panel 410 is in the extended position. At the lowered position, the pivoting member 428 has rotated inward and downward such that a lower surface of the pivoting member 428 contacts an upper surface of the slider 406, and a lower surface of the sliding panel 410 contacts an upper surface of the pivoting member 428. Outer surfaces of the slider 406, pivoting member 428, and sliding panel 410 may also be substantially flush with one another when the sliding panel 410 is in the lowered position. In addition, the notches of the sliding panel 410 may also contact the complementary panel ledges 456 at forward and rear ends of the slider 406 when the sliding panel 410 is in the lowered position.

Referencing FIGS. 4A-4D, in operation, in some implementations, a passenger manually actuates the sliding panel 410 from the fully extended, raised position to the fully retracted, stowed position and vice-versa. For example, the passenger may pull the sliding panel 410 forwards towards a seat bottom (e.g., seat bottom 312 of FIG. 3A) to a fully extended position, at which point the pivoting assembly 402 causes the sliding panel 410 to raise such that the armrest portions are inline and flush. The passenger may further lock the sliding panel 410 into position by pushing outwardly on the sliding panel 410 toward the aisle. Conversely, to stow the sliding panel 410 in its fully retracted state, the user may pull the sliding panel 410 inward toward the passenger seat and/or downward to disengage the sliding panel 410 from the locked state, and pull the sliding panel 410 backward toward a seat back (e.g., back portion 306 of FIG. 3A) of the passenger seat until the sliding panel 410 is fully retracted and nested against the fixed panel 408.

In further embodiments, the sliding armrest assembly includes an automated control mechanism, such as a linear actuator, controlling linear travel and, optionally, pivoting translation between raised and lowered positions. For example, a ballscrew drive may be used to drive the sliding panel along the linear translation assembly and to pivot the sliding panel 410 into raised position. Conversely, the ballscrew drive may pull against the sliding panel to effect a release force, releasing the sliding panel 410 from its extended, raised position and pulling the sliding panel back into its stowed position.

In an illustrative embodiment, a ball screw automated control assembly may include a nut which travels along a screw disposed parallel to the fixed panel to an end cap proximate an end of the fixed panel. The sliding panel, in the example, is connected to a pivoting mechanism portion of the nut such that the sliding panel is driven along the path of the screw, parallel to the fixed panel. The pivoting mechanism may be designed similar to the pivoting member 428 of FIG. 4B. The ball screw assembly may drive a front end of the sliding panel along a rail while pushing from the rear section of the sliding panel via the connection to the nut. At the point at which the nut contacts the end cap of the screw, the torque applied by a driving motor of the ball screw assembly for rotating the screw will translate into rotation of the nut, causing the pivoting mechanism portion of the nut to rotate upwards and lift the sliding panel into the raised position in line with the fixed panel.

In one example, the automated control mechanism includes a pneumatic extension mechanism for pushing the sliding panel into position. The pneumatic extension mechanism may apply air pressure to force the sliding panel along the rail to its extended position. The pneumatic extension mechanism may release air pressure to return the sliding panel to the retracted position. In a further example, the automated control mechanism may include a belt drive designed to translate the sliding panel along the linear translation mechanism from stowed position to deployed position and back. The automated control mechanism, in one example, may be activated through a control presented upon the armrest assembly, such as upon an armrest region. In another example, the automated control mechanism may be remotely activated. For example, in an emergency or at time of disembarkment, the sliding panels may be retracted to aid in exiting. In a further example, a touch screen control presented upon a display within a user seating module may be provided for actuation of the sliding panel using an automated control mechanism.

In additional embodiments, the sliding armrest assembly includes a user-activated extension mechanism, such as a coil spring or gas spring, aiding in sliding panel deployment. The user, upon stowing the sliding panel, may store energy potential such as spring force which, upon release, assists in deploying the sliding panel. A locking mechanism may maintain the sliding panel in position, overcoming the stored energy potential until release by the user (e.g., through actuation of a control). In illustration, a spring mechanism such as coil spring may be connected to a rear end of the sliding panel, such that the spring mechanism is extended upon actuation of the sliding panel to the deployed position. Extension of the sliding panel into deployed position, for example, may be provided through manual exertion. Upon stowing of the sliding panel, the spring encourages return of the sliding panel to the stowed position upon disengagement of a locking mechanism that maintains the position of the sliding panel in the deployed, raised position.

Turning to FIG. 5A, an inner perspective view of a sliding armrest assembly 518 in a lowered position is illustrated. The sliding armrest assembly 518 includes a fixed panel 508 and a sliding panel 510. In some implementations, the sliding panel 510 may translate horizontally from an extended position to a retracted position such that an outer surface of the sliding panel 510 is adjacent to an inner surface of the fixed panel 508 when a slider 506 of the sliding panel 510 translates horizontally along rail 504 until the slider 506 contacts a back extension stop 532 on the rail 504. In addition, as the sliding panel 510 translates across the rail 504, an upper surface of an armrest of the sliding panel 510 (see FIG. 3B) may be adjacent to a lower surface of an armrest 518 of the fixed panel 508.

Figure 5B:
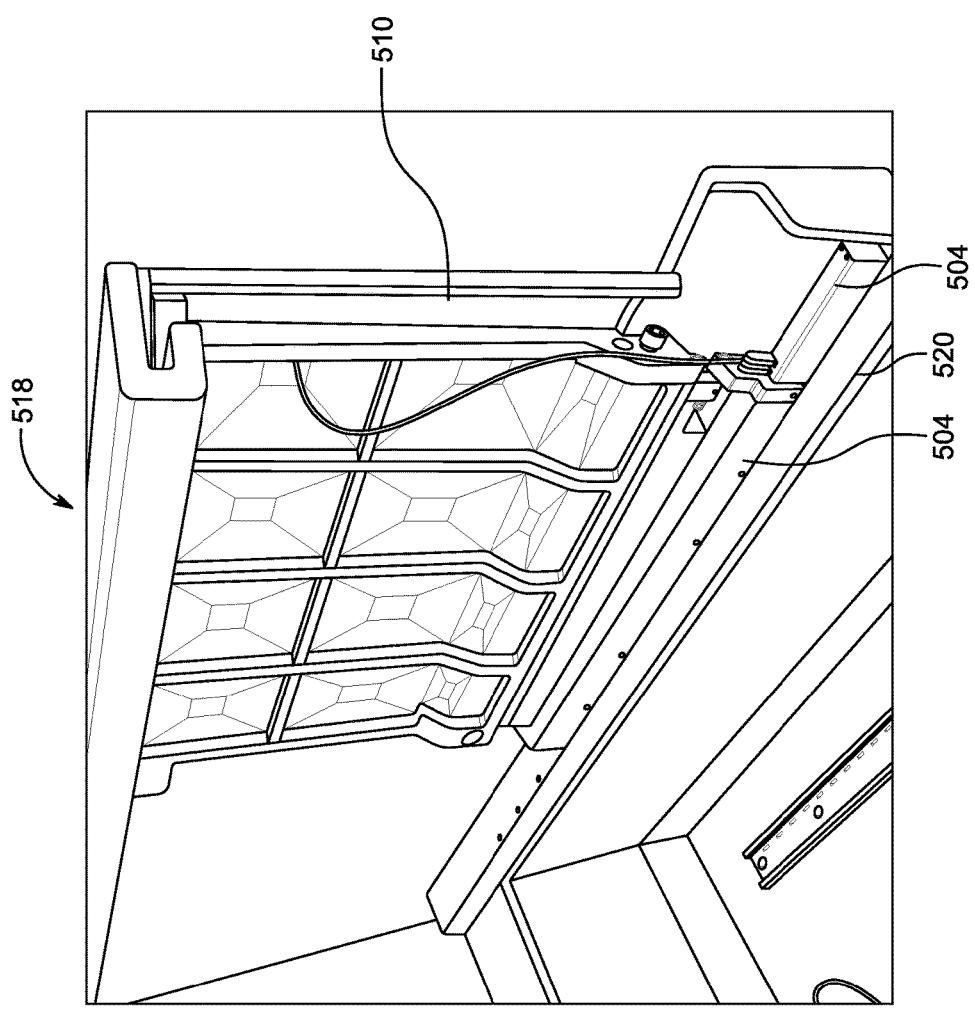
FIG. 5B is an exemplary illustration of a sliding armrest assembly in a partially retracted position.

In FIG. 5B, the sliding panel 510 of the sliding armrest assembly 518 is in a lowered and partially retracted position as the sliding panel translates horizontally across the rail 504. The sliding armrest assembly 518 may also include a buffer strip 520 that assists in keeping the slider 506 in alignment as the slider 506 moves across the rail 504. FIG. 5C is a perspective view of a seating module 500 for an aircraft with a sliding armrest assembly 518 in a partially retracted position. The seating module 500 includes a reclinable passenger seat 514 in an upright position with a back portion 506 that is substantially perpendicular to a back end of a seat bottom portion 512 and a foot rest 504 that is substantially perpendicular to a front end of the seat bottom portion 512 such that the foot rest 504 is tucked under the seat bottom portion 512 of the passenger seat 514. The sliding armrest assembly 518 is mounted to a base panel 516 of the seating module 500 and includes a fixed panel 508 and a sliding panel 510 in a partially retracted and lowered position. In one example, the sliding panel 510 is in the partially retracted position when a slider of a pivoting assembly of the sliding panel 510 contacts is in between a front extension stop and a back extension stop of a rail that provides a path for horizontal travel of the sliding panel 510 (see FIG. 5B). In the partially retracted position, a portion of an outer surface of the sliding panel 510 overlaps and is adjacent to an inner surface of the fixed panel 508, and a portion of an upper surface of an armrest 520*b* for the sliding panel 610 overlaps and is adjacent to a lower surface of an armrest 520*a* for the fixed panel 508.

Figure 6A:
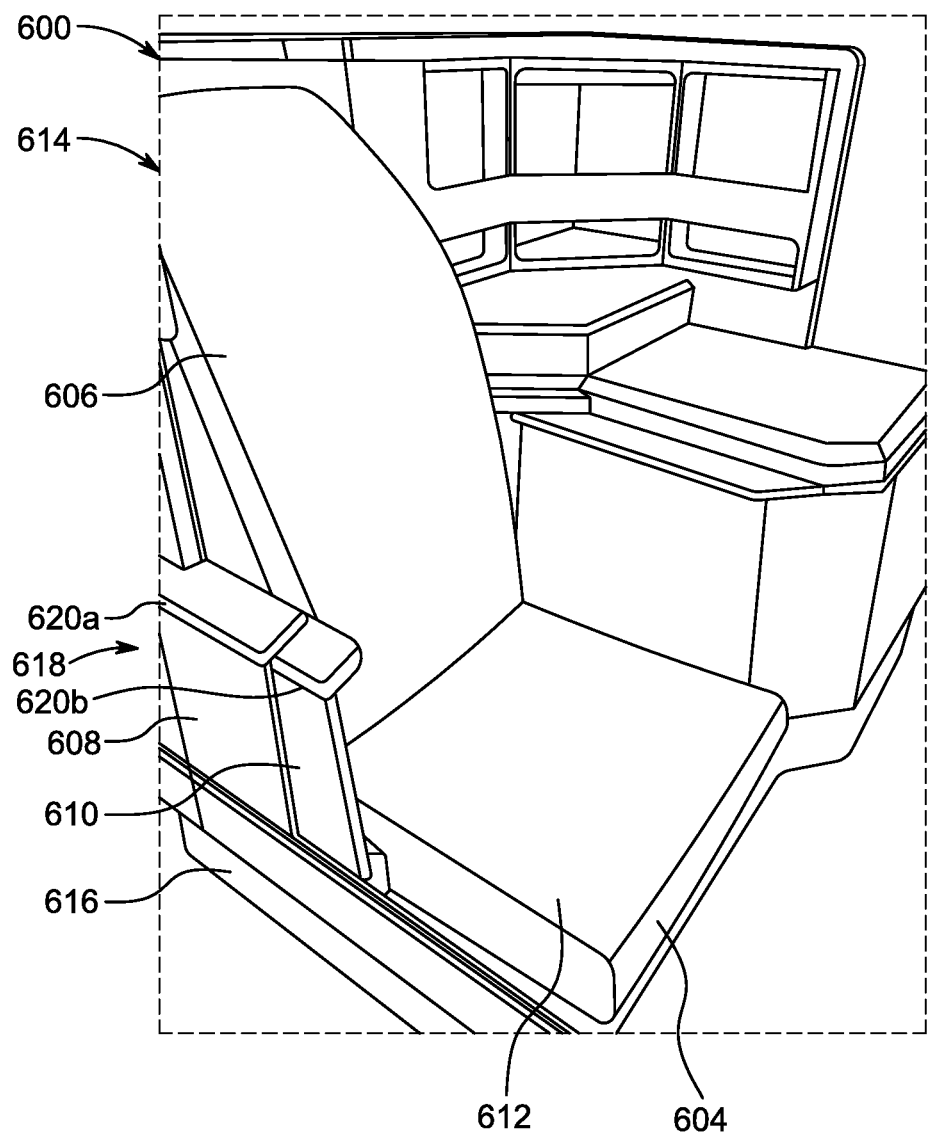
FIG. 6A is an exemplary illustration of a perspective view of a sliding armrest assembly in a retracted position.

Turning to FIG. 6A, a seating module 600 with a sliding armrest assembly 618 in a retracted position is illustrated. The seating module 600 includes a reclinable passenger seat 614 in an upright position with a back portion 606 that is substantially perpendicular to a back end of a seat bottom portion 612 and a foot rest 604 that is substantially perpendicular to a front end of the seat bottom portion 612 such that the foot rest 604 is tucked under the seat bottom portion 612 of the passenger seat 614. The sliding armrest assembly 618 is mounted to a base panel 616 of the seating module 300 and includes a fixed panel 608 and a sliding panel 610 in a retracted and lowered position. In one example, the sliding panel 610 is in the retracted position when a slider of a pivoting assembly of the sliding panel 610 contacts a back extension stop of a rail that provides a path for horizontal travel of the sliding panel 610 (see FIG. 5A). In the retracted position, an outer surface of the sliding panel 610 is adjacent to an inner surface of the fixed panel 508, and an upper surface of an armrest 620b for the sliding panel 610 is adjacent to a lower surface of an armrest 620a for the fixed panel 608.

Figure 6B:
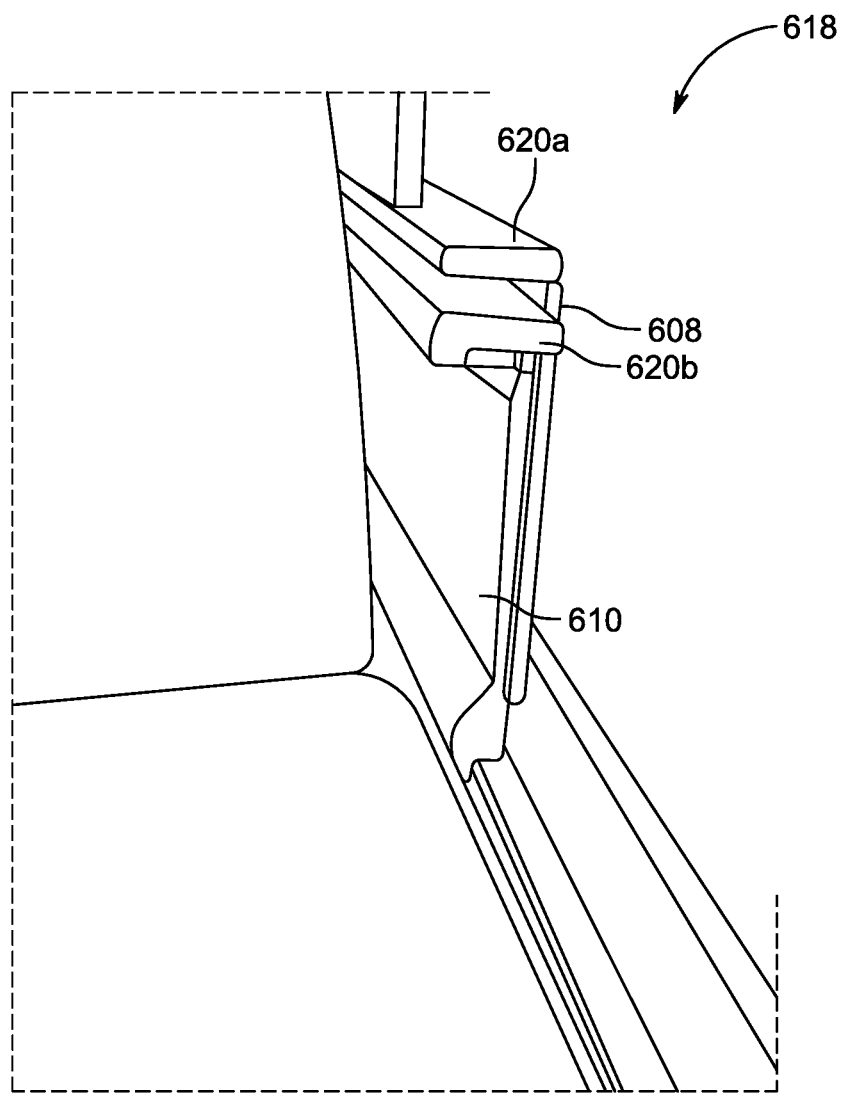
FIG. 6B is an inner perspective view of a sliding armrest assembly in a retracted position.
Figure 6C:
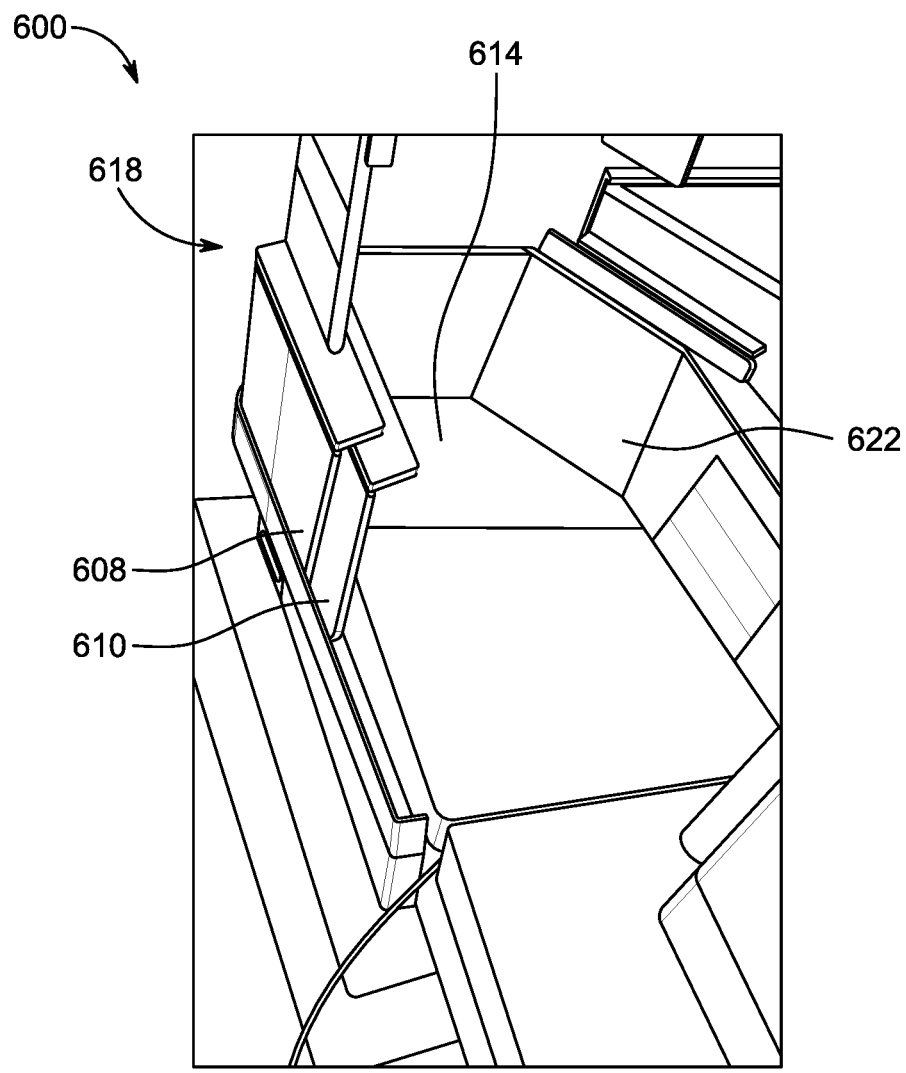
FIG. 6C is an exemplary illustration of a passenger egressing from a seating module with a sliding armrest assembly in a retracted position.

FIG. 6B illustrates an inner perspective view of the sliding armrest assembly 618 in a retracted position. When in the retracted position, a majority of an outer surface of the sliding panel 610 overlaps an inner surface of the fixed panel 608, and a majority of an upper surface of armrest portion 620b of the sliding panel is overlapped by armrest portion 620a of the fixed panel 608. Being able to move the sliding panel 610 from the extended to the retracted position provides improved ingress and egress capabilities for the passenger when the passenger seat 614 is in a reclined position as well as for PRM considerations. For example, FIG. 6C is an illustration of a passenger 622 egressing from the seating module 600 when the passenger seat 614 is in the fully reclined position and the sliding armrest assembly 618 is in a retracted position. Retracting the sliding panel 610 behind the fixed panel 608 provides a greater space for the passenger 622 to move in and out of the seating module 600 without being impeded by other modules or objects within the vicinity of the seating module 600.

Figure 7C:
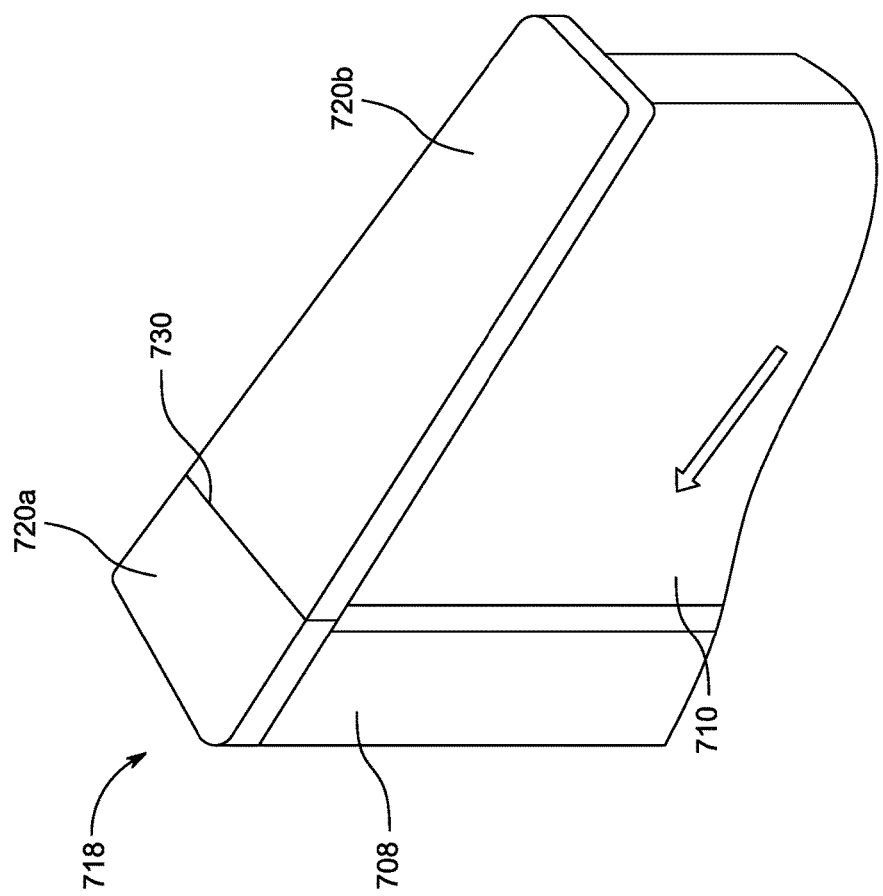

Turning to FIGS. 7A-7E, alternative embodiments of the sliding armrest assembly are illustrated. FIGS. 7A-7B show a portion of a sliding panel assembly 718 having a pocket door configuration. For example, FIG. 7A shows a sliding panel 710 with an armrest portion 720b in an unfolded position, and FIG. 7B shows the sliding panel 710 with the armrest portion in a folded or stowed position. The sliding panel 710, in some embodiments, retracts within a pocket region 702 of the fixed panel 708 when moving into the retracted position such that the sliding panel 710 is nested within the fixed panel 708. The pocket region 702 of the fixed panel may be hollow and have a volume with dimensions that correspond to dimensions of the sliding panel 710 to provide for receiving the sliding panel 710 into the pocket region 702. A width of the pocket region 702 of the fixed panel 708 may be slightly wider than a width of the sliding panel 710 to provide for smooth translation of the sliding panel 710 within the pocket region 702.

In some embodiments, the sliding panel 710 may include a pivoting assembly (see FIGS. 4A-4D) to provide for pivoting the sliding panel 710 between a raised, in-line position and a lowered position. As described above, in the extended and inline position, an outer surface of the sliding panel 710 is flush with an outer surface of the fixed panel 708 such that the sliding armrest assembly 718 resembles a single panel armrest assembly. In the lowered position, the sliding panel 710 is in line with the pocket region 702 of the fixed panel 708 to allow for translation of the sliding panel 710 within the pocket region 702. The sliding panel assembly 718 may also include a track (see FIGS. 4A-4D) or other guide mechanism for the sliding panel 710 that assists with guiding the sliding panel 710 into and out of the pocket region 702 of the fixed panel 708 during horizontal translation of the sliding panel 710.

In some implementations, an armrest portion 720b of the sliding panel 710 may rotate or fold into the sliding panel 710 during retraction such that the sliding panel 710 retracts within the pocket region 702 of the fixed panel 708 in a linear movement without being impeded by a width of the armrest portion 720b (FIG. 7B). For example, the armrest portion 720b may be connected to the sliding panel 710 by a pivoting connector such as a hinge 730 that allows the armrest portion 720b to be stowed in a recess 712 in the sliding panel 710 prior to retracting the sliding panel 710 into the pocket region 702 of the fixed panel 708. In some implementations, the hinge 730 may be included as part of the armrest portion 720b. In one example, the recess 712 is configured on an inner surface of the sliding panel 710, but in other examples the recess 712 may be configured on an outer surface of the sliding panel 710. In addition, when the sliding panel 710 is in the extended and raised position, the armrest portion 720b may be rotated back to a deployed position in which inner, upper, and outer surfaces are substantially flush with inner, upper, and outer surfaces of armrest portion 720a of the fixed panel 708 such that the armrest portions 720a and 720b resemble a single armrest structure.

Figure 7D:
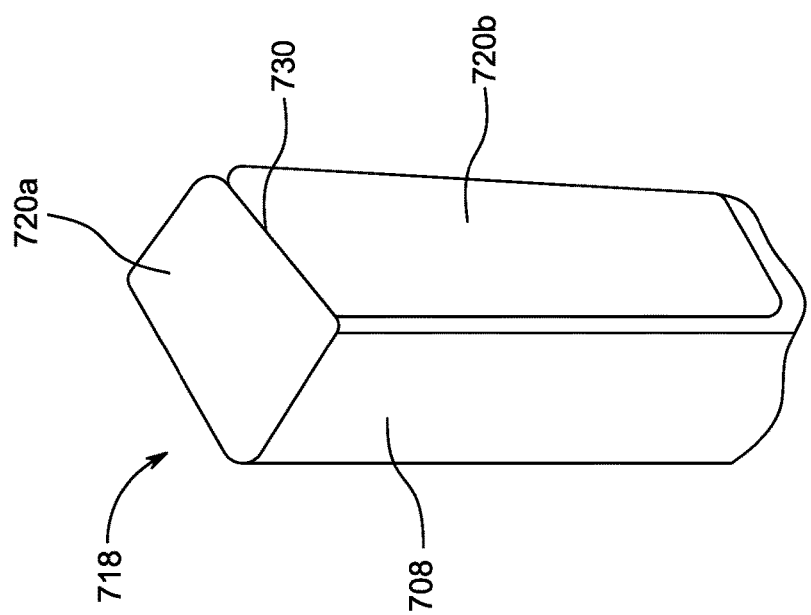

Turning to FIGS. 7C-7E, an alternate implementation of the sliding armrest assembly 718 is illustrated. The implementation of FIGS. 7C-7E, for example, may be used with the pocket door configuration of the fixed panel as described in relation to FIGS. 7A and 7B or with a nesting configuration as described in relation to 5A through 5C. For example, the sliding armrest assembly 718 may include a hinge 730 between the armrest portion 720a of the fixed panel 708 and the armrest portion 720b of the sliding panel 710 that allows the armrest portion 720b to be folded down to substantially cover the pocket region 702 of the fixed panel 708 when the sliding panel 710 is fully retracted into the pocket region 702 of the fixed panel 708 (see FIG. 7D). In some implementations, the hinge 730 may allow rotation of the armrest portion 720b in both upward and downward directions. For example, the armrest portion 720b can be rotated in an upward direction prior to and/or during retraction of the sliding panel 710 into the pocket region 702 of the fixed panel 708 (see FIG. 7E). Once the sliding panel 710 is fully retracted into the pocket region 702 of the fixed panel 708, the armrest portion 720b can be rotated in a downward direction to cover the pocket region 702.

It can also be understood that the implementations described in FIGS. 7A-7E with respect to the armrest portion 720b can also be applied to the other sliding armrest assembly configurations described previously herein. For example, the sliding armrest assembly 318 (see FIGS. 3A-3B) with the sliding panel 310 having an outer surface that is adjacent surface of the fixed panel 308 as the sliding panel 310 translates horizontally can also be configured with the rotating and/or folding armrest portions described above.

Aspects of the present disclosure are directed to providing enhanced passenger ingress and egress from aircraft seating modules that may be positioned along aisles of an aircraft cabin. The implementations of the sliding armrest assembly described above provide additional clearance space for PRM and other passengers to be able to more easily slide into and out of the seating module in situations where armrests, privacy panels, storage bins, and other seating modules may block the path for the passenger to enter or leave the seating module. In particular, when a passenger seat of the seating module is in a bed configuration such that the passenger seat extends toward and may make contact with a forward seating module, the sliding armrest assembly provides a way for the passenger to enter and leave the seating module without having to return the seat to the upright position beforehand. In addition, the pivoting assembly for the sliding panel of the sliding armrest assembly described above provides for rotating the sliding panel between a raised and lowered position such that the outer surface of the sliding panel is substantially flush with the fixed panel such that the fixed panel and sliding panel are part of an extended panel structure when the sliding panel is in the extended and raised, in-line positions.

Although illustrated in a configuration including an enclosed passenger seating unit where the arm rest assembly is incorporated into the panel enclosure rather than attached to the passenger seat itself, in other embodiments the armrest assembly may be provided as a feature connected to the passenger seat itself.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A passenger seating unit, comprising:
   a reclining passenger seat comprising a seat back and a seat bottom;
   a base disposed alongside the reclining passenger seat; and
   an armrest assembly disposed atop the base, the armrest assembly comprising:
      a fixed panel atop the base extending from an aft extent of the base to a position short of a forward extent of the base, the fixed panel comprising a first armrest portion disposed atop the fixed panel;
      a sliding panel atop the base moveable between a retracted position alongside and parallel to the fixed panel, and an extended position extending to the forward extent of the base, the sliding panel comprising a second armrest portion disposed atop the sliding panel;
      a translation assembly guiding movement of the sliding panel between the retracted and extended positions; and
      wherein the translation assembly raises the sliding panel vertically as the sliding panel moves from the retracted position to the extended position;
      wherein the first and second armrest portions align to create a continuous armrest when the sliding panel is in the extended position; and
      wherein the first and second armrest portions, in both the retracted and extended positions of the second armrest portion, reside in a horizontal plane above a horizontal plane of the seat bottom in any reclined state of the reclining passenger seat.

2. The passenger seating unit according to claim 1, wherein the passenger seating unit is adapted to be positioned adjacent an aircraft aisle with the base disposed between the reclining passenger seat and the aircraft aisle and the sliding panel disposed inward of the fixed panel and apart from the aircraft aisle when the sliding panel is in the retracted position.

3. The passenger seating unit according to claim 1, wherein the fixed panel and the sliding panel are collinear when the sliding panel is in the extended position.

4. The passenger seating unit according to claim 1, wherein the fixed panel comprises a pocket and the sliding panel stows within the pocket when the sliding panel is in the retracted position.

5. The passenger seating unit according to claim 1, wherein the translation assembly comprises a track affixed to the fixed panel and a slide affixed to the sliding panel, the slide configured to travel along the track to guide the sliding panel between the retracted and extended positions.

6. The passenger seating unit according to claim 5, wherein the track comprises front and back extension stops determining a length of horizontal travel of the sliding panel between the retracted and extended positions.

7. The passenger seating unit according to claim 1, wherein the first and second armrest portions are canted in a direction of the reclining passenger seat.

8. The passenger seating unit according to claim 1, wherein a face of the sliding panel facing the reclining passenger seat comprises at least one of padding and a fabric layer.

9. The passenger seating unit according to claim 1, wherein the translation assembly further comprises a spring-assisted pivoting assembly for raising and lowering the sliding panel.

10. The passenger seating unit according to claim 1, wherein the sliding panel comprises a notched edge at one end thereof the engages with a corresponding notched edge on a mating end of the fixed panel to secure the sliding panel relative to the fixed panel when the sliding panel is in the extended position.

* * * * *